Figures 1, 2, 3, 4:
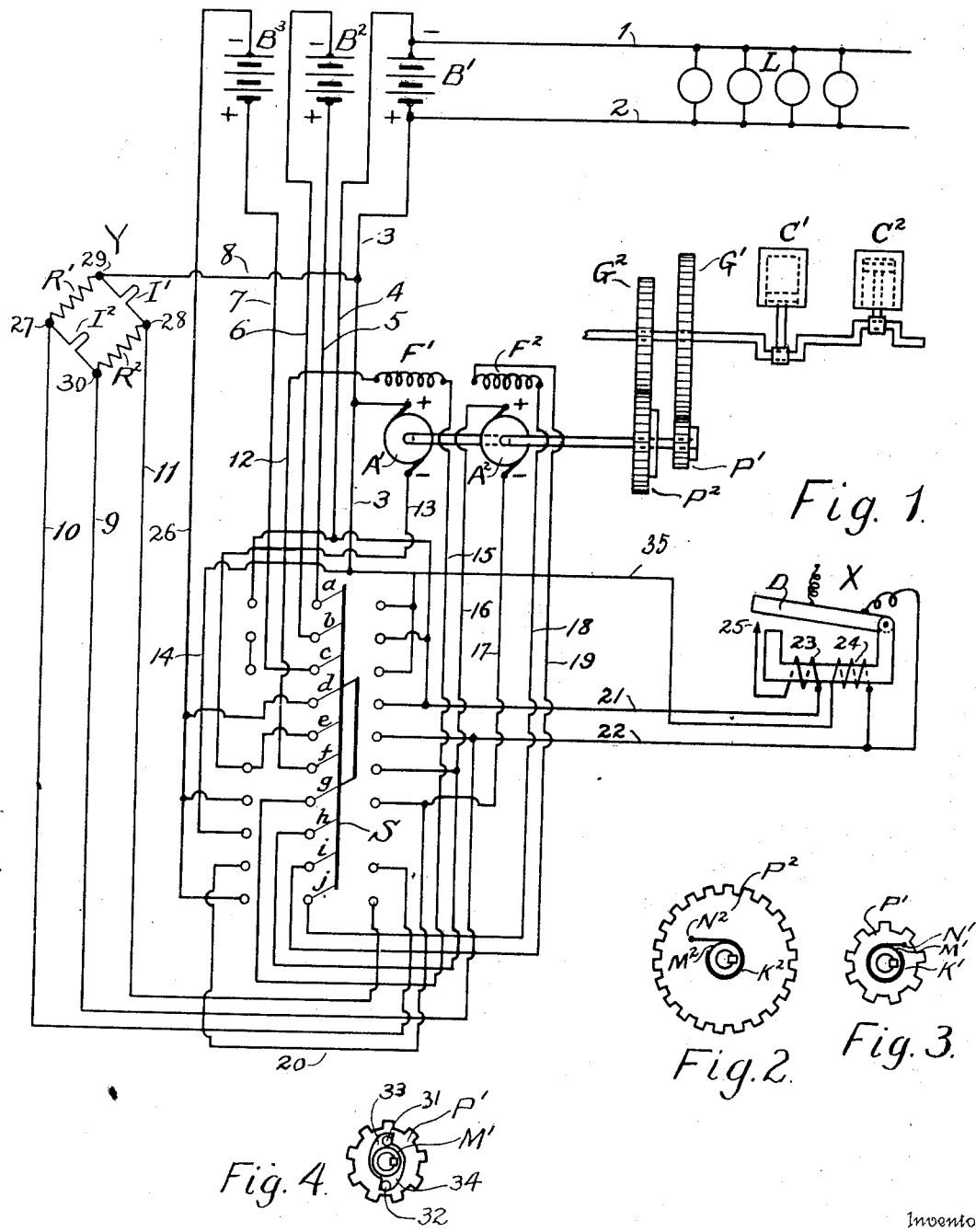

Joseph Lester Woodbridge

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,096,879.   Specification of Letters Patent.   Patented May 19, 1914.

Application filed March 23, 1911. Serial No. 616,424.

*To all whom it may concern:*

Be it known that I, JOSEPH LESTER WOODBRIDGE, a citizen of the United States, and resident of Philadelphia, in the county of Philadelphia, State of Pennsylvania, have invented certain new and useful Improvements in Systems of Electrical Distribution, of which the following is a specification.

My invention relates to systems in which a dynamo electric machine is driven by a gasolene engine or similar source of power, and is employed in conjunction with a storage battery for supplying current to electric lights or other translating devices, and the object of the invention is to provide means whereby the dynamo may be utilized as a motor for starting the engine, receiving current from the battery for this purpose, and after the engine is started may be utilized as a generator for supplying current to the lamps and battery. In order to develop the necessary torque for starting the engine with the smallest capacity of apparatus, and at the same time avoid excessive armature speed when the engine is driving the dynamo as a generator, I provide two different sets of gear wheels between the engine and dynamo shafts which are selective in their operation, one set controlling the speed ratio between the shafts when the engine is driving the dynamo, and the other set controlling this ratio when the dynamo is operating as a motor driving the engine. These results are accomplished by special clutch devices, which obviate the necessity of shifting the gears. I also provide means for changing the armature and field connections, and at the same time changing the connections of the battery cells from series to parallel.

My invention will be more clearly understood by reference to the following description in connection with the accompanying drawings, in which—

Figure 1 is a diagrammatic view of a system embodying features of the invention; Figs. 2 and 3 are end views of the two pinions drawn to an enlarged scale showing the clutch devices, and Fig. 4 illustrates a different type of clutch.

Referring to Fig. 1, $F^1$ and $F^2$ are the field windings, and $A^1$ and $A^2$ are the corresponding armatures of two dynamo electric machines mounted on a common shaft, on which are mounted the pinions $P^1$ and $P^2$, which mesh with the gears $G^1$ and $G^2$, the latter being mounted on the shaft of a gasolene or other explosive engine whose cylinders are shown at $C^1$ and $C^2$. A circuit 1—2 is shown supplying the lights L and three series of storage battery cells $B^1$, $B^2$ and $B^3$, of which $B^1$ is permanently connected across the circuit 1—2. A multiple blade switch S is shown arranged to accomplish the following general results. When this switch is thrown to the right the three sections of storage battery are connected in parallel, and the armature $A^2$ is connected as an exciter for exciting the field $F^1$ of the other machine, while the field $F^2$ of the exciter is connected across opposite points of a Wheatstone bridge Y, the other two opposite points of this bridge being at the same time connected across the brushes of the armature $A^1$. This bridge is designed, as will be explained later to maintain a substantially constant potential across the brushes of the machine $A^1$, regardless of variations of speed. An automatic switch X is also shown interposed between the negative terminal of the armature $A^1$ and the corresponding conductor of the circuit 1—2; this switch being designed to close when the generator voltage has reached a value suitable for connection to the circuit. When the switch S is thrown to the left, the batteries $B^1$, $B^2$ and $B^3$ are connected in series, and the armatures $A^1$ and $A^2$ are connected in parallel across the battery, each armature having its field interposed in series therewith, so that each machine operates as a series motor for starting the engine. When the switch S is thrown to the right, the various connections between the different circuits may be traced as follows: from the negative terminal of battery $B^1$ by way of conductor 4, switch blade $b$ and conductor 6 to the negative terminal of battery $B^2$; also from the negative terminal of battery $B^1$ via conductor 4, switch blade $d$ and conductor 26 to the negative terminal of battery $B^3$, thus connecting the three negative terminals of the batteries in parallel; also from the positive terminal of battery $B^1$, via conductor 3, switch blade $a$ and conductor 5 to the positive terminal of battery $B^2$; also from the positive terminal of battery $B^1$ via conductor 3, switch blade $c$ and conductor 7 to the positive terminal of battery $B^3$, thus connecting the three positive terminals of the batteries in parallel. From the negative terminal of armature $A^1$ via conductor 13, switch blade $e$, conductor 22, armature D of switch X, contact point 25 (when the switch is closed), series winding 23, conductor 21 and conductor 4 to the negative terminal of battery $B^1$; also from the positive terminal of armature $A^1$ via conductor 3 to the positive terminal of battery $B^1$; also from the positive terminal of exciter armature $A^2$ via conductor 16, switch blade $f$, conductor 12, field winding $F^1$, conductor 15, switch blade $g$ and conductor 17 to the negative brush of exciter armature $A^2$; also from the terminals of the exciter field $F^2$, via switch blades $i$ and $j$ and conductors 10 and 11 respectively to the opposite points 27 and 28 of the Wheatstone bridge Y. The other two points of the Wheatstone bridge 29 and 30 are connected by means of conductors 8 and 9 respectively, and switch blade $e$ in the last named circuit across the brushes of armature $A^1$.

The Wheatstone bridge Y comprises two resistances $R^1$ and $R^2$ in opposite branches; these resistances having zero temperature coefficient, or preferably an appreciable negative coefficient, so that their resistance will decrease with increase of temperature. In the other two branches of the bridge are shown two resistances $I^1$ and $I^2$ having a high positive temperature coefficient, such as the well known iron wire resistances which serve to maintain a substantially constant current with wide variations of impressed voltage above a certain value. The function of this Wheatstone bridge is as follows: When the impressed voltage across the points 29 and 30 reaches a critical value such that the drop in the resistances $R^1$ and $R^2$, due to the constant current maintained by the iron wire resistances $I^1$ and $I^2$, is just half of the potential across the brushes of the dynamo $A^1$, the potential of the points 27 and 28 of the Wheatstone bridge will be equal, and no current will flow through the field $F^2$ of the exciter. The voltage across the brushes of the armature $A^1$ can, therefore, never reach this value since there would then be no excitation for the field of the exciter, and, therefore, no excitation for the field $F^1$. As the speed of the machine increases, the voltage across the brushes of the armature $A^1$ will approach this critical value, but by proper design of the machine, the difference between the actual voltage, and the limiting value, may be made very small over a wide range of speed. This voltage may be adjusted to maintain the batteries in a full state of charge without appreciable overcharge, the dynamo $A^1$ supplying the current for the lights, so long as its speed is sufficient to develop the necessary electro-motive force.

The automatic switch X, which is interposed between the negative brush of the dynamo $A^1$ and the negative terminal of the battery $B^1$ is provided with a shunt winding 24 connected by means of conductor 35 on one side and conductor 22, switch blade $e$ and conductor 13 on the other side, across the brushes of dynamo $A^1$, which serves to close the switch X when the potential of the dynamo has risen to a suitable value. The series coil 23 serves to hold the switch closed so long as the current is supplied in the right direction from the dynamo. If, however, the speed of the dynamo is reduced sufficiently to produce a reversal of current from the battery into the dynamo, this reversal in the series coil 23 will oppose the excitation of shunt coil 24, and release the armature D, thus opening the circuit. When the switch S is thrown to the left, the connections may be traced, as follows: From the negative terminal of battery $B^1$, via conductor 4, switch blade $a$ and conductor 5 to the positive terminal of battery $B^2$. From the negative terminal of battery $B^2$, via conductor 6, switch blades $b$ and $c$, and conductor 7 to the positive terminal of battery $B^3$. From the negative terminal of battery $B^3$, via conductor 26, switch blade $g$, conductor 15, field winding $F^1$ conductor 12, switch blade $f$ and conductor 13 to the negative brush of armature $A^1$; also from the negative terminal of battery $B^3$, via conductor 26, switch blade $j$, conductor 18, field winding $F^2$, conductor 19, switch blade $i$, conductors 20 and 17 to the negative brush of armature $A^2$. Positive terminal of battery $B^1$ is connected by conductor 3 to the positive brush of armature $A^1$; also via conductors 3 and 14, switch blade $h$ and conductor 16 to the positive brush of armature $A^2$. Thus the two armatures $A^1$ and $A^2$ are connected in parallel to act as series motors to start up the engine.

It remains to describe the special clutch devices by which the two trains of gearing are made selective in their operation. The gear wheels $G^1$ and $G^2$ are rigidly attached to the engine shaft. The pinions $P^1$ and $P^2$ are, however, free to revolve on the dynamo shaft, but are arranged to be mechanically connected thereto by means of the clutch devices shown in Figs. 2 and 3. Fig. 2 is an enlarged end view of pinion $P^2$. A hub $M^2$ is shown keyed to the shaft, while an elastic band clutch $K^2$ is wrapped about this hub, and is firmly attached to the pinion at $N^2$, the other end of the elastic band being free. Whenever the pinion $P^2$ is driven by the engine in a counter-clock-wise direction, the elastic band $K^2$ will grip the hub $N^2$ and drive the armature shaft in that direction. If, however, the armature shaft is revolving in the same direction, but at a higher rate of speed than the pinion, the elastic band $K^2$ will be released so that the dynamo will not drive the pinion. This clutch, therefore, provides means whereby the engine can drive the dynamo but the dynamo cannot drive the engine.

In Fig. 3 is shown a similar view of pinion P¹. The hub M¹ is keyed to the shaft and an elastic band clutch K¹ is wrapped about the hub, and fastened to the pinion at the point N¹. This clutch K¹ is, however, wrapped about the hub M¹ in the reverse direction from the clutch K² in Fig. 2. It follows, therefore, that when the speed of the dynamo shaft becomes greater than that of the pinion P¹, the shaft will drive the pinion, thereby driving the engine. The pinion cannot, however, drive the dynamo shaft. It will be seen, therefore, that by means of these two clutches and gear trains, the dynamos A¹ and A² operating as motors will start up the engine by means of the pinion P¹, rotating in a counter-clock-wise direction. The pinion P¹ being smaller than P², the speed of the dynamo shaft will be greater than that of the pinion P², and the clutch K² will not grip. The speed reduction of pinion P¹ and gear G¹ permits developing the high starting torque necessary to overcome the compression in the cylinders C¹ and C². As soon, however, as the engine is started its speed will increase, and it will tend to drive the dynamos A¹ and A². As soon, however, as there is any tendency to transmit power from the engine to the dynamo, the clutch K¹ will be released, while the clutch K² will grip, and the gear G² and pinion P² will then determine the speed of drive. The switch S which had been thrown to the left to make connection for operating the armatures A¹ and A² as motors may then be thrown to the right, connecting the machines for operation as generator and exciter, and as soon as the voltage of the machine A¹ has reached a suitable value the automatic switch X will close and the dynamo A¹ will supply current to the circuit 1—2, and the batteries.

Fig. 4 illustrates a different type of clutch in connection with pinion P¹; designed, however to accomplish the same results. In Fig. 4 the same hub M¹ is shown keyed to the dynamo shaft. The pinion is provided with irregular shaped recesses 33 and 34 which provide tapering spaces between their surfaces and the cylindrical surface of the hub M¹. In these spaces two steel balls 31 and 32 are free to revolve. When the dynamo shaft is rotating in a counter-clock-wise direction faster than the pinion P¹, the steel balls will roll into the narrow portion of the space between the hub and the pinion, and will jam in this space causing the dynamo shaft to drive the pinion. If, however, the pinion is driven at a speed greater than the dynamo shaft the steel balls will be released, and will revolve freely in the larger portion of the space, thus releasing the pinion from the shaft.

It will be understood that any type of clutch which will transmit the driving force in one direction only may be used, and I do not confine myself to any particular type of clutch. Any of the well known means for transmitting mechanical power between the two shafts may also be employed.

Having described my invention what I claim and desire to secure by Letters Patent is—

1. In combination, an internal combustion engine, a storage battery and its consumption circuit, dynamo-electric apparatus including two mechanically connected armatures, transmission gear interposed between the engine and the dynamo-electric apparatus, and electrical connections including switches for running both armatures as motors from the battery to start the engine, and for running one armature as an exciter for the other operating as a generator to charge the battery and supply the consumption circuit.

2. In combination, an internal combustion engine, a storage battery and its consumption circuit, dynamo-electric apparatus including two mechanically connected armatures, selective transmission gear interposed between the engine and the dynamo-electric apparatus, and adapted to start the engine from the dynamo at one speed ratio and to run the dynamo from the engine at lower ratio of dynamo to engine speed, and electrical connections including switches for running both armatures as motors from the battery to start the engine and for running one armature as an exciter for the other operating as a generator to charge the battery and supply the consumption circuit.

3. In combination an internal combustion engine, a storage battery, two armatures mechanically connected together and to the engine, circuit connections for running both armatures from the storage battery as motors to start the engine, a field regulator and circuit connections for permitting one of said armatures to act as a dynamo when driven by the engine to charge the battery and for causing the field regulator and the other armature operating as an exciter to regulate the charging voltage as the engine speeds up.

In testimony whereof I have hereunto signed my name.

JOSEPH LESTER WOODBRIDGE.

Witnesses:
J. H. TRACY,
R. A. WHITSTONE, Jr.